Patented June 21, 1938

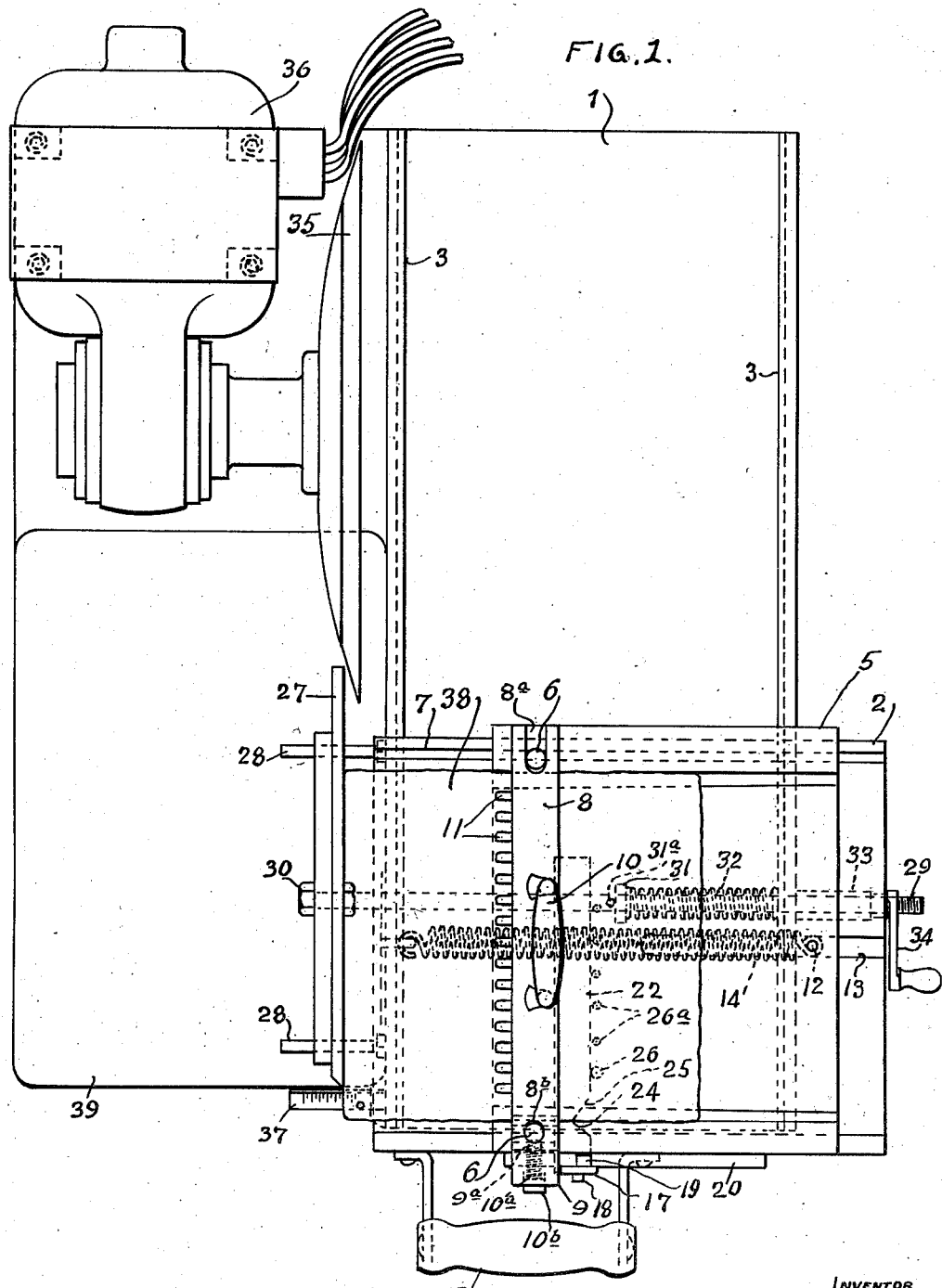

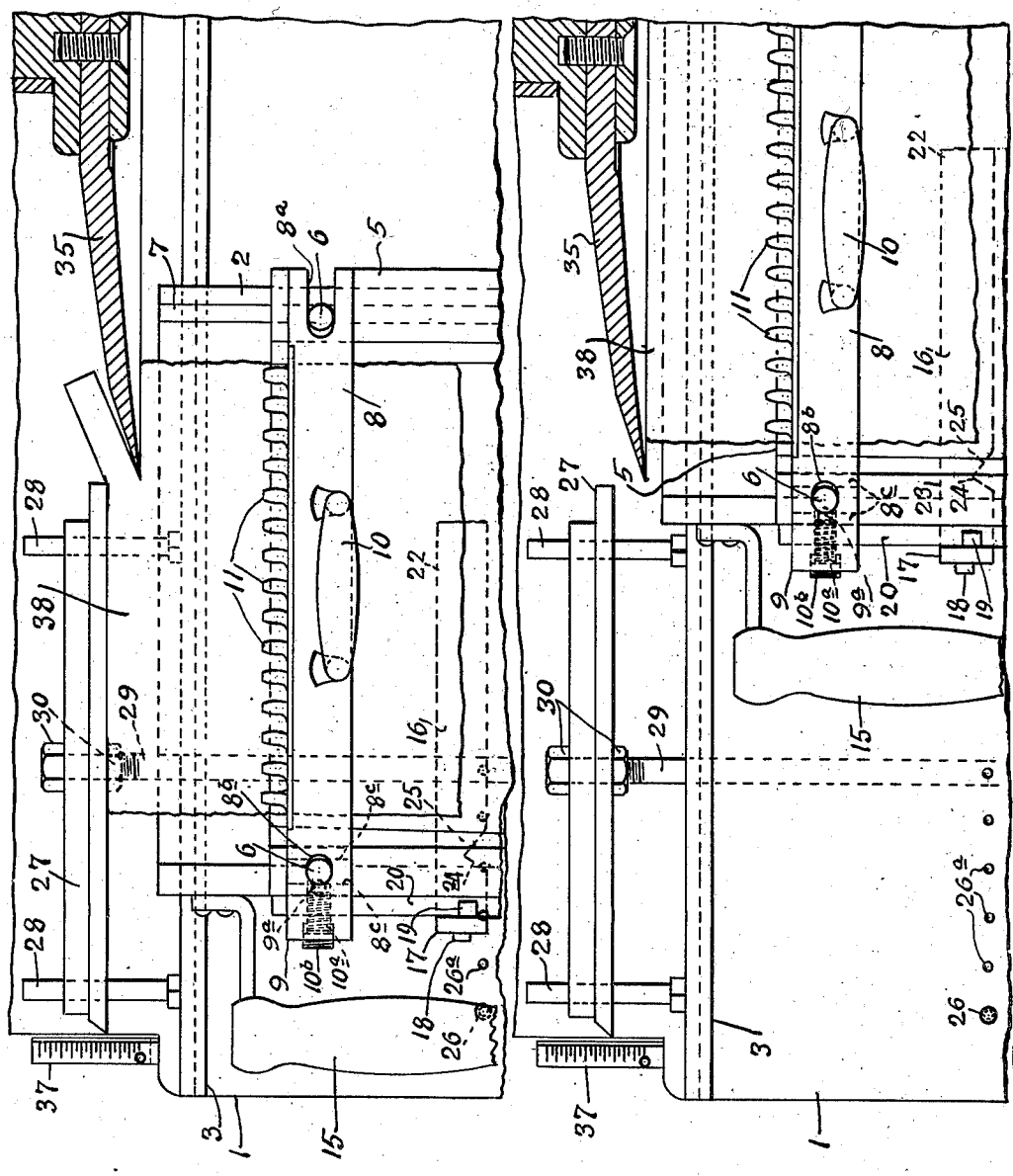

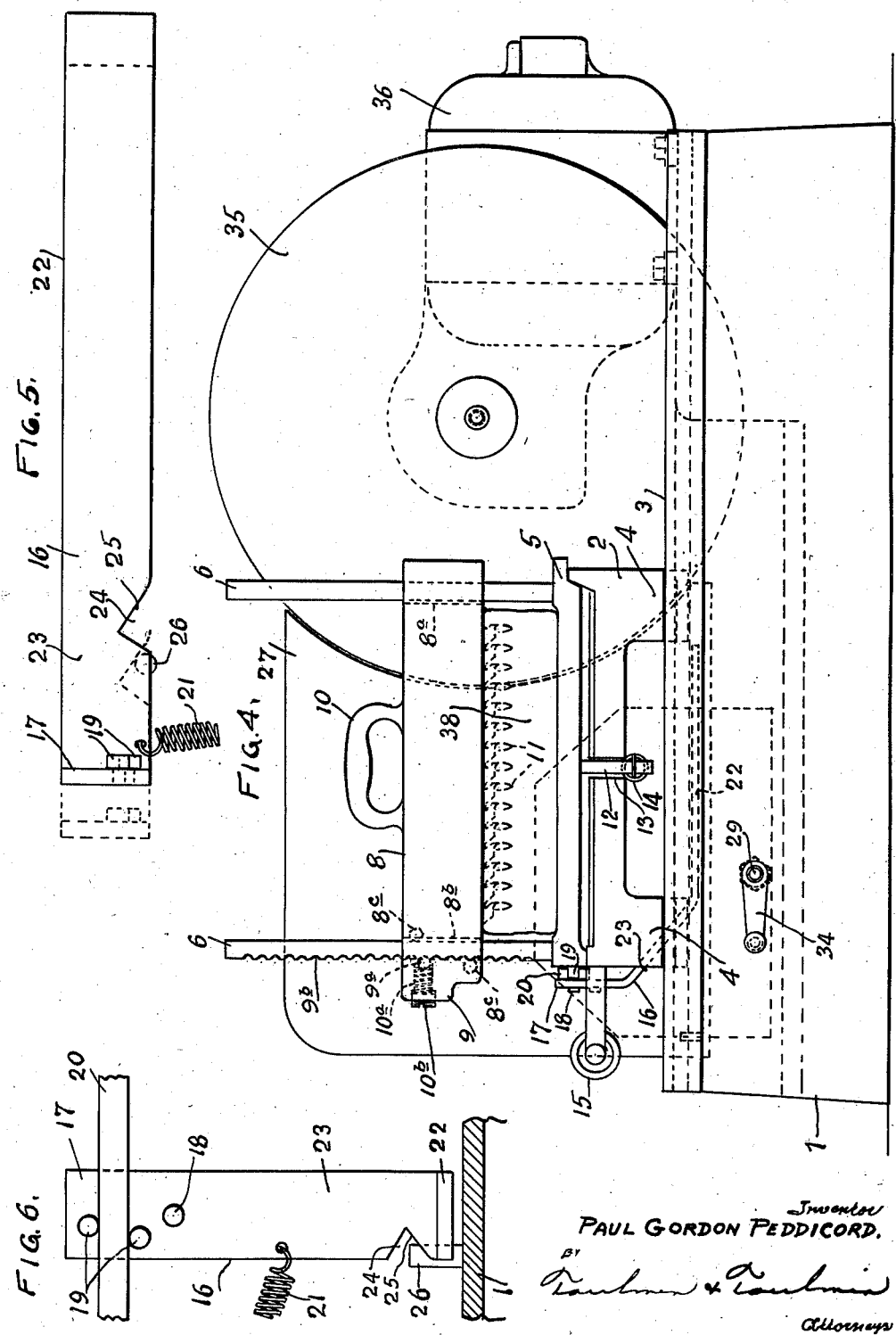

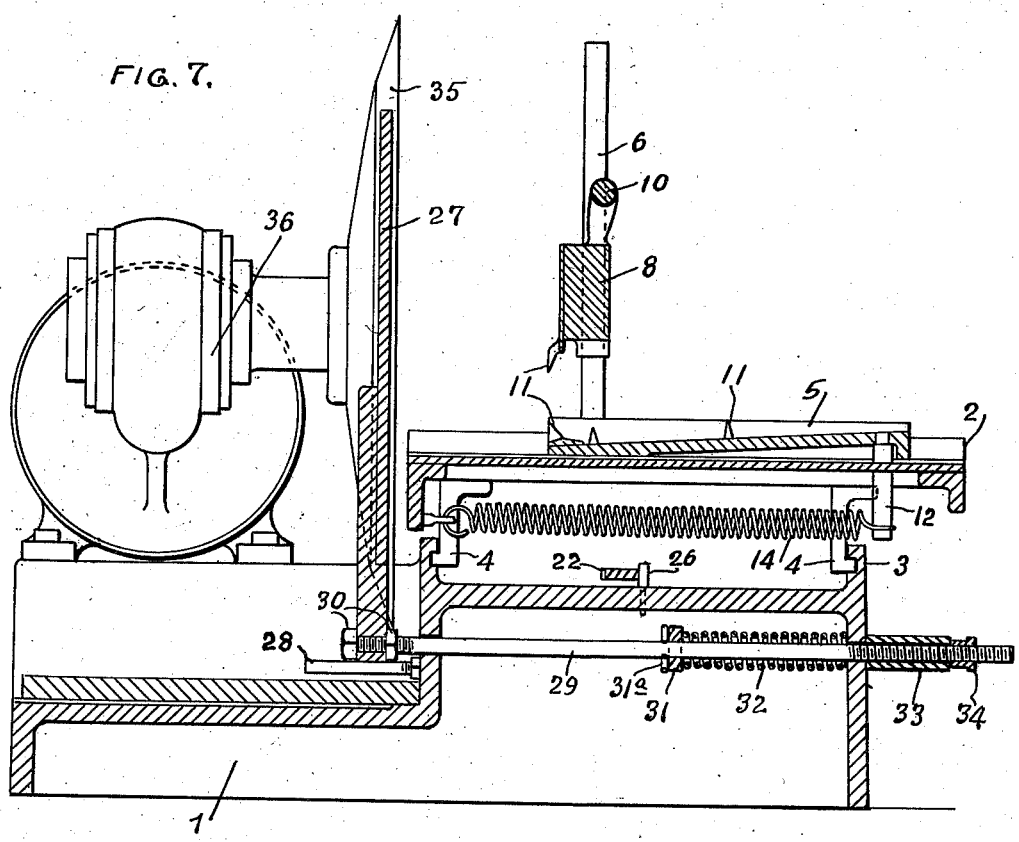
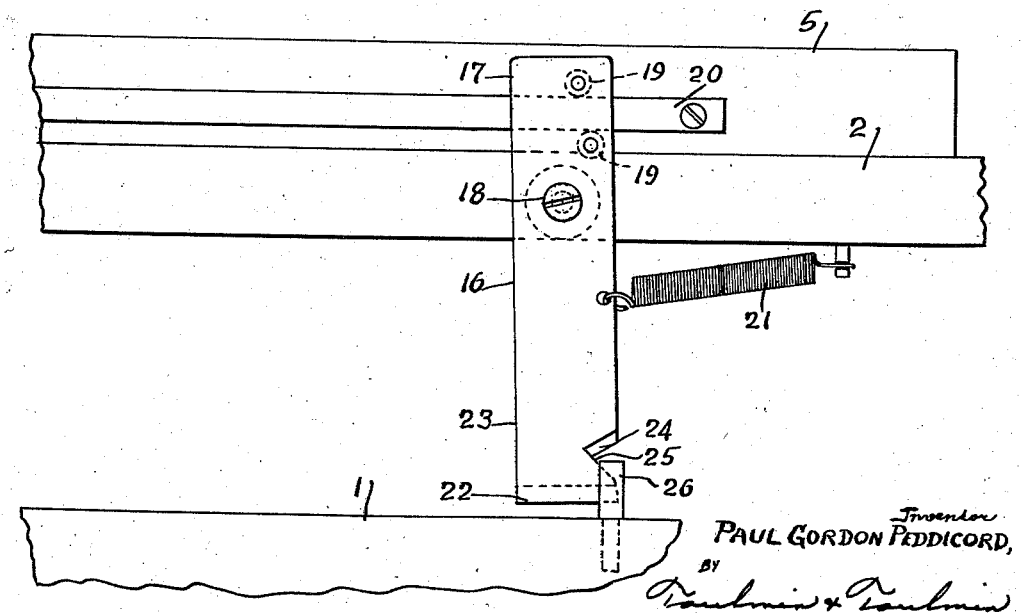

2,121,349

UNITED STATES PATENT OFFICE 2,121,349

SLICING APPARATUS

Paul G. Peddicord, Piqua, Ohio, assignor to U. S. Slicing Machine Company, La Porte, Ind., a corporation of Indiana Application September 10, 1931, Serial No. 562,115

13 Claims. (Cl. 146—102)

This invention relates to improvements in food slicing machines, and has for its object the provision of an automatic food holder and feeder so positioned and controlled that the food carried thereby will not press against the side of the cutting knife.

It frequently happens in machines of this kind that the food or material being sliced presses against the side of the knife and the rapidly-rotating knife draws the juice and parts of the food off, making it necessary to provide some scraper means for cleaning the knife during the operation. In the present slicing apparatus such knife cleaning means is not necessary.

It is an object of this invention to provide, in connection with a food holder and feeder, an automatically operated means for preventing the pressing of the food or articles to be sliced against the side of the cutting blade.

It is also an object of this invention to provide, in connection with a rotating slicer blade and in connection with a carriage adapted to move in a plane parallel to the face of the blade and adjacent thereto, means on the carriage to stop a food holder and feeder so that the food will not be pressed against the blade during the slicing operation.

It is particularly the object of this invention to provide, in connection with a slicing machine having a feeder adapted to move transverse of the blade, means to lock the feeder against transverse movement, and means to release the locking means after the slicing action has been fully completed.

It is also an object of this invention to provide, in connection with food slicing means, adjustable means for determining the thickness of the slice.

These and other advantages will appear from the following description taken in connection with the drawings:

Referring to the drawings:

Figure 1 is a top plan view showing the carriage with the article, such as a piece of bacon, in a position thereon ready to be fed to the blade.

Figure 2 is an enlarged top plan view of a section of the apparatus showing the carriage in its feeding position with the blade just entering the food or article to be sliced.

Figure 3 is a view similar to Figure 2 but showing the position of the carriage after the slicing has been finished.

Figure 4 is a view at right angles to the view shown in Figure 1 with the carriage partly advanced across the side of the blade.

Figure 5 is a top plan view of the feeder lock used to prevent the transverse movement of the feeder.

Figure 6 is a front elevation of the feeder lock.

Figure 7 is a vertical, transverse section showing the position of applicant's feeder lock.

Figure 8 is a fragmentary view of the rear elevation of the machine showing the feeder lock.

In the present slicing apparatus or machine there is the usual base 1 supported in the conventional manner. Mounted upon this base for longitudinal movement thereon is a carriage 2 supported on trackways 3, which have slots therein. In these slots are brackets 4 which support the carriage. These parts are shown in Figure 7. In the present instance there are four of the brackets 4, one at each corner of the carriage, with a prong or projection fitting in a slot in the trackway 3.

Resting on top of the carriage and supported thereon for transverse movement with relation to the carriage is a food holder or feeder 5. Suitable guides or trackways 7 are provided so that this feeder is guided in its transverse movement on the carriage. Extending upwardly from each side of the food holder or feeder is a post 6. These posts carry a longitudinally extending food clamp 8, one end of which has a notch $8^a$ to receive one post while the other end has a hole $8^b$ to receive the other post. On opposite sides of the hole are lock pins $8^c$. These pins, two in number, are out of horizontal alignment with each other so that when the notch-end of the clamp is pressed up, the pins will grip the post. On the hole end of the clamp is a projection 9, by which the clamp may be released and raised. Cooperating with the pins in holding the clamp in position on the posts is a ball $9^a$ which fits in any one of a plurality of notches $9^b$ on one side of one of the posts. The ball rests in a hole in the pin end of the clamp and is held against the post by means of a spring $10^a$ held against the ball by an adjustable screw $10^b$.

On top of the food clamp is a handle loop 10 which may be gripped by the hand for raising the food clamp in order to place the food beneath the food clamp and on top of the food holder. In order to assist the food clamp in properly holding the food or the article to be sliced, teeth 11 are provided both on the food clamp and also on the food holder or feeder.

Extending downwardly from the righthand end of the food holder or feeder is a projection 12 which extends through a slot 13 in the carriage. To this projection one end of a spring 14 is attached, while the other end of the spring is attached by some suitable means to the left side of the carriage. By means of this spring the food holder or feeder is urged toward the left against the knife or the gauge means for determining the thickness of the slice of food to be cut.

For the purpose of moving the carriage longitudinally on the base and trackway there is provided a handle loop 15, as shown in Figure 1. This handle is similar in shape to handle 10 and is to be gripped by the hand of the operator for manipulating the carriage and causing it to travel on the trackway.

In order to prevent the food holder from urging the food or article being sliced against the side of the blade used for slicing purposes, means is provided for holding the food holder or feeder in a fixed position during the slicing operation, which consists in a forward and a backward movement. For this purpose there is provided a feeder lock 16 which consists of a bar which has a vertical part 17 attached by means of a pivot 18 to the front edge of the carriage 2. The vertical part of the feeder lock extends above the pivot 18 to provide clamp means to engage a rib 20 on the front edge of the food holder or feeder. The clamp means consists of two pins 19, spaced from each other so as to engage opposite sides of the rib 20. These pins are also spaced out of vertical alignment with each other when the part 17 is in vertical position. The upper pin is so positioned with relation to the lower pin that when the lower end of the vertical part 17 is moved to the right, as shown in Figure 8, these pins will readily grip the rib 20 so as to hold the food holder or feeder against movement toward the blade. The pins 19 are caused to grip the rib 20 by means of a spring 21, which has one end attached to the part 17 and the other end attached to the carriage by any suitable means. This spring at all times tends to hold the pins 19 in engagement with the rib 20, thereby locking the food holder or feeder against movement toward the blade.

This feeder lock is to prevent the spring 14 from moving the food holder and the food thereon toward the blade except when the pins 19 are released from engagement with the rib 20. This release takes place at the end of each complete slicing operation so that after a slice has been cut from the food or article to be sliced and has been removed, the feeder lock is released and the spring 14 forces the food holder and the food thereon toward the slicer plate, later to be described, and in front of the blade so that the food or article to be sliced may have another slice cut therefrom.

In order that the feeder lock may be released there is provided a horizontal part 22 connected to the vertical part by means of a diagonal part 23. In the diagonal part 23, adjacent the horizontal part, a notch 24 is provided which furnishes a cam 25. This cam 25 is at the end of the horizontal part adjacent the diagonal part 23.

For engagement with this cam for releasing the feeder lock, a release stud or pin 26 is suitably located on the base 1. The notch 24 is in the diagonal part 23 and has a side that extends downwardly and terminates at a point where the diagonal part 23 merges into the horizontal part 22. This side forms the cam 25, which is engaged by the pin 26 just sufficiently long to engage the horizontal part 22 and to engage the cam part 25 forming the lower side or edge of the notch 24. The location of this pin is determined by the size of the article to be cut. If it is a small article the pin will be located in one position, and if it is a large article, such as a ham, the pin will be located in another position. And in order to provide for the adjustment of the pin or stud, holes 26ª are suitably located in the base in a line parallel to the cutter blade. The pin is so located that it will not contact with the feeder lock during the complete slicing operation, which consists of a forward feeding movement and a withdrawal movement. It is at the end of the withdrawal movement that the pin engages the cam, whereby the rib 20 is released and the food holder or feeder is moved toward the left, as shown in Figure 7, against a slicer plate or gauge member 27, due to the action of the spring 14.

This gauge member is located on the lefthand side of the slicing machine, adjacent the cutter blade, and is supported by a plurality of aligning studs 28 suitably located in the base. In order to adjust the slicer plate or gauge to and from the carriage a shaft 29 is provided, which is attached to the slicer plate by means of nuts 30 engaging opposite sides of the slicer plate, as shown in Figure 7. This shaft extends entirely across one end of the base and projects beyond the base.

Intermediate the ends of this shaft is a shoulder 31 attached to the shaft in any suitable manner, in the present instance by a pin 31ª. Between this shoulder and a wall of the base is a spring 32, tending to urge the shaft in a lefthand direction, as shown in Figure 7. On the outside end of the shaft 29 is a sleeve 33 against which a large threaded end of an adjusting handle 34 abuts for moving the shaft longitudinally across the base so that the slicer plate or gauge may be adjusted with relation to the carriage for determining the thickness of the slice of food to be cut.

The slicer blade 35 in the present instance is disc-shaped and operated by a motor 36 suitably connected thereto by some suitable gear mechanism, not shown. In order to determine the thickness of the slice to be cut there is provided adjacent one edge of the slicer plate or gauge a gauge member 37 by which the thickness of the slice may be determined. The loaf of bread or article being sliced is indicated by the numeral 38. There is also provided on the lefthand side of the slicer plate and blade a table for receiving the slices as they are cut from the article being sliced, whatever it may be.

Figures 1, 2 and 3 present three stages in the operation of the apparatus. In Figure 1 the carriage is at the rear end of the base. When the carriage is in this position, the food holder or feeder is released, due to the pin pressing upon the side of the horizontal part of the feeder lock 16. The food is being pressed against the spacer plate through the action of the spring 14. As the carriage is moved forward, the pin 26 passes off the surface of the edge of the feeder lock so that the food holder is prevented from pressing against the knife as the food is cut or sliced.

In Figure 2 the carriage has been advanced so that the pin is free from the feeder lock. The food is partly sliced. The carriage is advancing toward the front of the base. Due to the locking action, the food is not pressed against the face of the rapidly rotating knife so that particles are not gathered on the knife and therefore do not have to be scraped therefrom by a scraper blade.

In Figure 3 the carriage has advanced beyond the leading edge of the blade. The slice has been completely removed from the article from which it is taken. In this position the carriage is ready to be retracted for another forward movement. During the backward movement of the carriage, the food is held against advancement toward the blade so that no particles are removed therefrom by the rapidly rotating blade. As the carriage is retracted, the lock member will contact with the pin 26, thereby releasing the food holder or feeder so that the food is advanced against the spacer blade, due to the action of the spring 14. The carriage is again in the position shown in Figure 1, ready for another forward slicing movement.

With the pin or stud 26 in the rearmost hole 26ᵃ, the carriage will have to be fed the full extent of its backward movement in order to release the feeder lock. When the pins or studs are thus located, the apparatus is well adapted to slice strips of bacon but if articles of food, such as a loaf of bread, were desired to be sliced, the loaf would be placed near the rear of the food holder or feeder and since the loaf does not extend more than half way toward the front of the food holder or feeder, it would be unnecessary to retract or withdraw the carriage the full length of its possible movement. Therefore, the stud or pin may be placed in another hole in the rear of the hole in which the pin is shown to be in Figures 1, 2 and 3. The pin is placed in such a hole that the loaf of bread on the return stroke will be withdrawn just beyond the cutting edge of the blade before the pin is engaged by the feeder lock. By placing the pin in various holes, the movement of the carriage may be adjusted to suit foods or articles of various widths.

I desire to comprehend within my invention such modifications as may be embraced within my claims and the scope of my invention.

Having thus fully described my invention, what I claim as new and desire to secure by Letters Patent, is:

1. A slicing machine comprising a gauge member, a slicing knife, a substance feeder, said substance feeder and said slicing knife being relatively movable transversely whereby to bring the substance feeder alternately into alignment with the gauge member and with the slicing knife, said substance feeder being movable forward toward the gauge member and slicing knife through a given range of feeding travel, means yieldingly urging the feeder forward, means operable in any position of said feeder within said range of travel for preventing operation of said feeder by the urging means, means for disabling said preventing means, means controlled by the relative transverse movement between the slicing knife and substance feeder for operating said disabling means in timed relation to the cycle of such relative transverse movement, and means for varying the time of operation of the disabling means in respect to said cycle of movement.

2. A slicing machine comprising a gauge member, a slicing knife, a substance feeder, said substance feeder and said slicing knife being relatively movable transversely whereby to bring the substance feeder alternately into alignment with the gauge member and with the slicing knife, said substance feeder being movable forward toward the gauge member and slicing knife through a given range of feeding travel, means yieldingly urging the feeder forward, means operable in any position of said feeder within said range of travel for preventing operation of said feeder by the urging means, means for disabling said preventing means, means controlled by the relative transverse movement between the slicing knife and substance feeder for operating said disabling means in timed relation to the cycle of such relative transverse movement, and means for varying the time of operation of the disabling means in respect to said cycle of movement, said varying means comprising a pair of cooperating abutment assemblies, one of said assemblies being adjustable with respect to the other.

3. A slicing machine comprising a gauge member, a slicing knife, a substance feeder, said substance feeder and said slicing knife being relatively movable transversely whereby to bring the substance feeder alternately into alignment with the gauge member and with the slicing knife, means yieldingly urging the substance feeder longitudinally forward toward the gauge member and slicing knife, means for preventing movement of the substance feeder longitudinally forward when the feeder is aligned with the slicing knife, and means operable when the feeder is in alignment with the gauge member for disabling the preventing means, means controlled by the relative transverse movement between the slicing knife and substance feeder for operating said disabling means in timed relation to the cycle of such relative transverse movement, and means for varying the time of operation of the disabling means in respect to said cycle of movement.

4. A slicing machine comprising a gauge member, a slicing knife, a substance feeder, said substance feeder and said slicing knife being relatively movable transversely whereby to bring the substance feeder alternately into alignment with the gauge member and with the slicing knife, means yieldingly urging the substance feeder longitudinally forward toward the gauge member and slicing knife, means for preventing movement of the substance feeder longitudinally forward when the feeder is aligned with the slicing knife, and means operable when the feeder is in alignment with the gauge member for disabling the preventing means, means controlled by the relative transverse movement between the slicing knife and substance feeder for operating said disabling means in timed relation to the cycle of such relative transverse movement, and means for varying the time of operation of the disabling means in respect to said cycle of movement, said varying means comprising a pair of cooperating abutment assemblies, one of said assemblies being adjustable with respect to the other.

5. A slicing machine comprising a gauge member, a slicing knife, a carriage, said carriage and said slicing knife being relatively movable transversely whereby to bring the carriage alternately into alignment with the gauge member and the slicing knife, a substance feeder on the carriage movable forward toward the gauge member and slicing knife through a given range of feeding travel, means yieldingly urging the feeder forward, locking means operable in any position of said feeder within said range of travel for preventing operation of said feeder by the urging means, said locking means comprising an elongated member secured to the feeder, a movable lever on the carriage, and a pair of similar projections fixed on and extending from the lever engageable with opposite sides of the elongated member on movement of the lever whereby to lock the lever and elongated member together.

6. A slicing machine comprising a guage member, a slicing knife, a carriage, said carriage and said slicing knife being relatively movable transversely whereby to bring the carriage alternately into alignment with the gauge member and with the slicing knife, a substance feeder mounted on the carriage, means yieldingly urging the substance feeder longitudinally forward toward the gauge member and slicing knife, locking means for preventing movement of the substance feeder longitudinally forward when the carriage is aligned with the slicing knife, and means operable when the carriage is aligned with the gauge member for disabling the locking means, said locking means comprising an elongated member secured to the feeder, a movable lever on the carriage, and a pair of similar projections fixed on and extending from the lever engageable with opposite sides of the elongated member on movement of the lever whereby to lock the lever and elongated member together.

7. A slicing machine including, with a carriage mounted for reciprocation along the faces of a slicing knife and gauge plate which provides therewith a cutting plane for the slicing operation, a transversely movable work-piece moving mechanism on the carriage having means normally urging it toward the cutting plane, together with means normally resisting movement of said mechanism toward the cutting plane to avoid frictional contact of the work-piece with the knife and gauge plate on the return stroke of the carriage comprising cooperating braking elements having braking engagement with each other and one of said elements being relatively movable by means operated by the movement of the carriage and effective in one position to release the other to permit said mechanism to advance toward the gauge plate at a time in relation to the beginning of the forward stroke of the carriage, and means for varying the time of operation of said braking element in respect to the movement of said carriage.

8. A slicing machine comprising a rotary slicing knife, a gauge plate arranged to one side of the knife substantially in the cutting plane thereof, a carriage reciprocable across the face of the gauge plate and the face of the knife, a substance feeder mounted on the carriage for movement toward the cutting plane, a spring resiliently urging the feeder toward the cutting plane, and locking means for locking the feeder from movement by said spring, said locking means comprising an elongated member secured to the feeder, a movable lever on the carriage, and a pair of similar projections fixed on and extending from the lever engageable with opposite sides of the elongated member on movement of the lever whereby to lock the lever and elongated member together.

9. A slicing machine comprising a rotary slicing knife, a gauge plate arranged to one side of the knife substantially in the cutting plane thereof, a carriage reciprocable across the face of the gauge plate and the face of the knife, a substance feeder mounted on the carriage for movement toward the cutting plane, a spring resiliently urging the feeder toward the cutting plane, and locking means for locking the feeder from movement by said spring, said locking means comprising an elongated rail on the feeder, a lever pivoted to the carriage, and a pair of studs projecting from said lever on opposite sides of the elongated rail, said studs being engageable with opposite sides of the rail on pivotal movement of the lever whereby to lock the lever and the rail together.

10. A slicing machine comprising a frame, a rotary slicing knife, a gauge plate arranged to one side of the knife substantially in the cutting plane thereof, a carriage reciprocable across the face of the gauge plate and the face of the knife, a substance feeder mounted on the carriage for movement toward the cutting plane, a spring resiliently urging the feeder toward the cutting plane, and locking means for locking the feeder from movement by said spring, means controlled by the movement of the carriage in its cycle of movement for operating said locking means, and means for varying the time of operation of said last named means with respect to the cycle of movement of the carriage.

11. A slicing machine comprising a frame, a rotary slicing knife, a gauge plate arranged to one side of the knife substantially in the cutting plane thereof, a carriage reciprocable across the face of the gauge plate and the face of the knife, a substance feeder mounted on the carriage for movement toward the cutting plane, a spring resiliently urging the feeder toward the cutting plane, and locking means for locking the feeder from movement by said spring, means controlled by the movement of the carriage in its cycle of movement for operating said locking means, and means for varying the time of operation of said last named means with respect to the cycle of movement of the carriage, said varying means comprising a pair of abutment assemblies on the carriage and on the frame of the machine, one of said abutment assemblies being adjustable with respect to the other.

12. A slicing machine comprising a frame, a rotary slicing knife, a gauge plate arranged to one side of the knife substantially in the cutting plane thereof, a carriage reciprocable across the face of the gauge plate and the face of the knife, a substance feeder mounted on the carriage for movement toward the cutting plane, a spring resiliently urging the feeder toward the cutting plane, and locking means for locking the feeder from movement by said spring, means controlled by the movement of the carriage in its cycle of movement for operating said locking means, and means for varying the time of operation of said last named means with respect to the cycle of movement of the carriage, said varying means comprising an abutment lever on the carriage and a cooperating abutment on the frame of the machine, said cooperating abutment being adjustable to any of a plurality of predetermined positions on the frame.

13. A slicing machine comprising a frame, a rotary slicing knife, a gauge plate arranged to one side of the knife substantially in the cutting plane thereof, a carriage reciprocable across the face of the gauge plate and the face of the knife, a substance feeder mounted on the carriage for movement toward the cutting plane, a spring resiliently urging the feeder toward the cutting plane, and locking means for locking the feeder from movement by said spring, means controlled by the movement of the carriage in its cycle of movement for operating said locking means, and means for varying the time of operation of said last named means with respect to the cycle of movement of the carriage, said varying means comprising an abutment lever on the carriage, and a cooperating abutment pin on the frame of the machine, the frame being provided with a plurality of openings in predetermined positions into which the pin may be removably secured.

PAUL G. PEDDICORD.